US008379634B2

(12) United States Patent
Bender et al.

(10) Patent No.: US 8,379,634 B2
(45) Date of Patent: *Feb. 19, 2013

(54) SYSTEM AND METHODS TO ROUTE CALLS OVER A VOICE AND DATA NETWORK

(75) Inventors: Doug Bender, Scotts Valley, CA (US); Anthony Zalenski, Boca Raton, FL (US); John M Cooney, San Carlos, CA (US)

(73) Assignee: Augme Technologies, Inc., New York, NY (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/552,772

(22) Filed: Sep. 2, 2009

(65) Prior Publication Data
US 2009/0323920 A1    Dec. 31, 2009

Related U.S. Application Data

(63) Continuation of application No. 10/624,433, filed on Jul. 22, 2003, now Pat. No. 7,606,217.

(60) Provisional application No. 60/484,385, filed on Jul. 2, 2003.

(51) Int. Cl.
*H04L 12/66* (2006.01)
(52) U.S. Cl. .......................... 370/352; 370/401; 370/466
(58) Field of Classification Search .................. None
See application file for complete search history.

(56) References Cited

U.S. PATENT DOCUMENTS

| 5,402,481 | A  | 3/1995  | Waldman |
| 5,809,128 | A  | 9/1998  | McMullin |
| 5,987,103 | A  | 11/1999 | Martino |
| 6,014,440 | A  | 1/2000  | Melkild et al. |
| 6,091,732 | A  | 7/2000  | Alexander, Jr. et al. |
| 6,104,757 | A  | 8/2000  | Rhee |
| 6,118,768 | A  | 9/2000  | Bhatia et al. |
| 6,125,113 | A  | 9/2000  | Farris et al. |
| 6,256,778 | B1 | 7/2001  | Oliver |
| 6,351,730 | B2 | 2/2002  | Chen |
| 6,359,880 | B1 | 3/2002  | Curry et al. |
| 6,404,870 | B1 | 6/2002  | Kia et al. |
| 6,445,694 | B1 | 9/2002  | Swartz |
| 6,449,251 | B1 | 9/2002  | Awadallah et al. |
| 6,496,477 | B1 | 12/2002 | Perkins et al. |
| 6,603,774 | B1 | 8/2003  | Knappe et al. |
| 6,618,761 | B2 | 9/2003  | Munger et al. |
| 6,658,496 | B1 | 12/2003 | Minakata et al. |
| 6,760,324 | B1 | 7/2004  | Scott et al. |
| 6,763,226 | B1 | 7/2004  | McZeal, Jr. |
| 6,771,594 | B1 | 8/2004  | Upadrasta |
| 6,788,769 | B1 | 9/2004  | Waites |

(Continued)

OTHER PUBLICATIONS

Barkley et al., U.S. Appl. No. 10/969,516, entitled "Portable VOIP Service Access Module," filed Oct. 20, 2004 (abandoned).

(Continued)

*Primary Examiner* — Hassan Phillips
*Assistant Examiner* — Duc Duong
(74) *Attorney, Agent, or Firm* — J. Peters Paredes; Rosenbaum IP

(57) ABSTRACT

Systems and methods to route a call over a voice and data network (VDN) are provided. A particular method includes receiving a call from a calling device at a telecommunications gateway (TCG). Authentication data is received via the call. A determination is made whether a user account associated with the authentication data is authorized to route calls via the TCG to a VDN. When the user account is authorized to route calls via the TCG to the VDN, call data received at the TCG via the call is converted into a format compatible with the VDN. The converted call data is sent via the VDN to a destination device.

19 Claims, 7 Drawing Sheets

U.S. PATENT DOCUMENTS

| | | |
|---|---|---|
| 6,795,540 B1 | 9/2004 | Mow |
| 6,822,957 B1 | 11/2004 | Schuster et al. |
| 6,826,174 B1 | 11/2004 | Erekson et al. |
| 6,856,612 B1 | 2/2005 | Bjelland et al. |
| 6,895,000 B2 | 5/2005 | Lai et al. |
| 6,934,258 B1 | 8/2005 | Smith et al. |
| 6,947,417 B2 | 9/2005 | Laursen et al. |
| 7,012,888 B2 | 3/2006 | Schoeneberger et al. |
| 7,016,481 B2 | 3/2006 | McElvaney |
| 7,042,841 B2 | 5/2006 | Abdelilah et al. |
| 7,046,683 B1 | 5/2006 | Zhao |
| 7,213,766 B2 | 5/2007 | Ryan et al. |
| 7,227,938 B2 | 6/2007 | Rodman et al. |
| 7,280,530 B2 | 10/2007 | Chang et al. |
| 7,283,542 B2 | 10/2007 | Mitchell |
| 7,302,053 B2 | 11/2007 | Chang et al. |
| 7,336,654 B2 | 2/2008 | Barkley et al. |
| 7,764,955 B1 * | 7/2010 | Mangal et al. ................. 455/417 |
| 2001/0028642 A1 * | 10/2001 | Veschi .......................... 370/352 |
| 2001/0038033 A1 | 11/2001 | Habib |
| 2002/0052965 A1 | 5/2002 | Dowling |
| 2002/0080776 A1 * | 6/2002 | Norris et al. .................. 370/352 |
| 2002/0097843 A1 | 7/2002 | Krol et al. |
| 2002/0114321 A1 * | 8/2002 | Ogren .......................... 370/352 |
| 2002/0131604 A1 | 9/2002 | Amine |
| 2002/0147912 A1 | 10/2002 | Shmueli et al. |
| 2002/0184376 A1 | 12/2002 | Sternagle |
| 2002/0191621 A1 | 12/2002 | Jha |
| 2002/0191768 A1 | 12/2002 | Stoughton |
| 2003/0002479 A1 | 1/2003 | Vortman et al. |
| 2003/0023669 A1 | 1/2003 | DeLima et al. |
| 2003/0031165 A1 * | 2/2003 | O'Brien, Jr. .................. 370/352 |
| 2003/0093606 A1 | 5/2003 | Mambakkam et al. |
| 2003/0110257 A1 | 6/2003 | Hyun et al. |
| 2003/0112820 A1 | 6/2003 | Beach |
| 2003/0123388 A1 | 7/2003 | Bradd |
| 2003/0152210 A1 * | 8/2003 | Delaney et al. .......... 379/220.01 |
| 2003/0161453 A1 | 8/2003 | Veschi |
| 2003/0204619 A1 | 10/2003 | Bays |
| 2003/0214939 A1 | 11/2003 | Eldumiati et al. |
| 2003/0219006 A1 | 11/2003 | Har |
| 2004/0019539 A1 | 1/2004 | Raman et al. |
| 2004/0032860 A1 | 2/2004 | Mundra et al. |
| 2004/0032862 A1 | 2/2004 | Schoeneberger et al. |
| 2004/0047451 A1 | 3/2004 | Barker et al. |
| 2004/0086093 A1 | 5/2004 | Schranz |
| 2004/0114581 A1 | 6/2004 | Hans et al. |
| 2004/0133668 A1 | 7/2004 | Nicholas, III |
| 2004/0141508 A1 | 7/2004 | Schoeneberger et al. |
| 2004/0141758 A1 | 7/2004 | El-Reedy |
| 2004/0165558 A1 | 8/2004 | Ling et al. |
| 2004/0205023 A1 | 10/2004 | Hafer et al. |
| 2004/0205777 A1 | 10/2004 | Zalenski et al. |
| 2004/0218583 A1 | 11/2004 | Adan et al. |
| 2004/0223458 A1 | 11/2004 | Gentle |
| 2004/0248590 A1 | 12/2004 | Chan et al. |
| 2004/0258003 A1 | 12/2004 | Kokot et al. |
| 2005/0074031 A1 | 4/2005 | Sunstrum |
| 2005/0074122 A1 | 4/2005 | Fascenda |
| 2005/0089052 A1 | 4/2005 | Chen et al. |
| 2005/0091392 A1 | 4/2005 | Gesswein et al. |
| 2005/0094621 A1 | 5/2005 | Acharya et al. |
| 2005/0138183 A1 | 6/2005 | O'Rourke et al. |
| 2005/0180464 A1 | 8/2005 | McConnell et al. |
| 2005/0195799 A1 | 9/2005 | Burne et al. |
| 2005/0201414 A1 | 9/2005 | Awais |
| 2005/0220083 A1 | 10/2005 | Takeuchi |
| 2005/0243733 A1 | 11/2005 | Crawford et al. |
| 2006/0008059 A1 | 1/2006 | Ying et al. |
| 2006/0029062 A1 | 2/2006 | Rao et al. |
| 2006/0029063 A1 | 2/2006 | Rao et al. |
| 2006/0031393 A1 | 2/2006 | Cooney et al. |
| 2006/0034296 A1 | 2/2006 | Talucci |
| 2006/0037071 A1 | 2/2006 | Rao et al. |
| 2006/0039356 A1 | 2/2006 | Rao et al. |
| 2006/0276230 A1 | 12/2006 | McConnell |
| 2007/0248081 A1 | 10/2007 | Barkley et al. |
| 2008/0025291 A1 | 1/2008 | Barkley et al. |
| 2009/0156222 A1 | 6/2009 | Bender |

OTHER PUBLICATIONS

Bennet, B., "Memory in a Flash," www.theage.com.au, Jan. 31, 2004, 3 pgs.

"Brief Introduction to QiiQ Communications Inc. and Eccocarrier Inc.," www.qiiq.com, printed Jun. 10, 2005 and Jul. 17, 2007, 7 pgs.

Camarillo, G. et al, "Integration of Resource Management and Session Initiation Protocol (SIP)," RFC 3312, Oct. 2002, pp. 1-30.

"CommGenie VoIP Suite," www.nexge.com, printed Jun. 1, 2005, 3 pgs.

EcoCarrier, "Ecophone," www.ecocarrier.com, printed Jun. 13, 2005, 3 pgs.

"EcoFone + VoIP!Phone Q-FONE-USB," printed Jun. 10, 2005, 3 pgs.

"Pocki Phone—VoIP Softphone + USB Flash Disk Drive (128M)," www.welltech.com, printed Oct. 5, 2004, 2 pgs.

"Pre-paid Call Credits—Adding Extra Call Credits," www.2hands.com.au, printed Jun. 1, 2005, 2 pgs.

Rosenberg, J. et al, "STUN—Simple Traversal of User Datagram Protocol (UDP) Through Network Address Translators (NATs)," RFC 3489, Mar. 2003, 47 pgs.

Rosenberg, J. et al, "SIP: Session Initiation Protocol," RFC 3261, Jun. 2002, 18 pgs.

Schulzrinne, H., "Dynamic Host Configuration Protocol (DHCP-for-IPv4) Option for Session Initiation Protocol (SIP) Servers," RFC 3361, Aug. 2002, 7 pgs.

"SIPphoneCasting. Inspired by: Skype Podcast Recorder = SkypeCasters," www.linuxathome.com, Dec. 29, 2004, 4 pgs.

Tittel, E. "Cool Tools: USB Desktop Peripherals and Devices," www.certmag.com, Jun. 2005, 7 pgs (accessed Jul. 20, 2007).

Tittel, E. "Cool Tools: USB Desktop Peripherals and Devices," www.certmag.com, Jun. 2005, 3 pgs (accessed Jul. 16, 2009).

Trembley, J. "VoIP makes real-time billing a necessity," Billing Plus, vol. 6, No. 17, Oct. 4, 2004, pp. 13.

"Web Based VoIP Billing, VoIP Routing, and VoIP Management Software," www.webvoip.com, printed Jun. 1, 2005, 2 pgs.

* cited by examiner

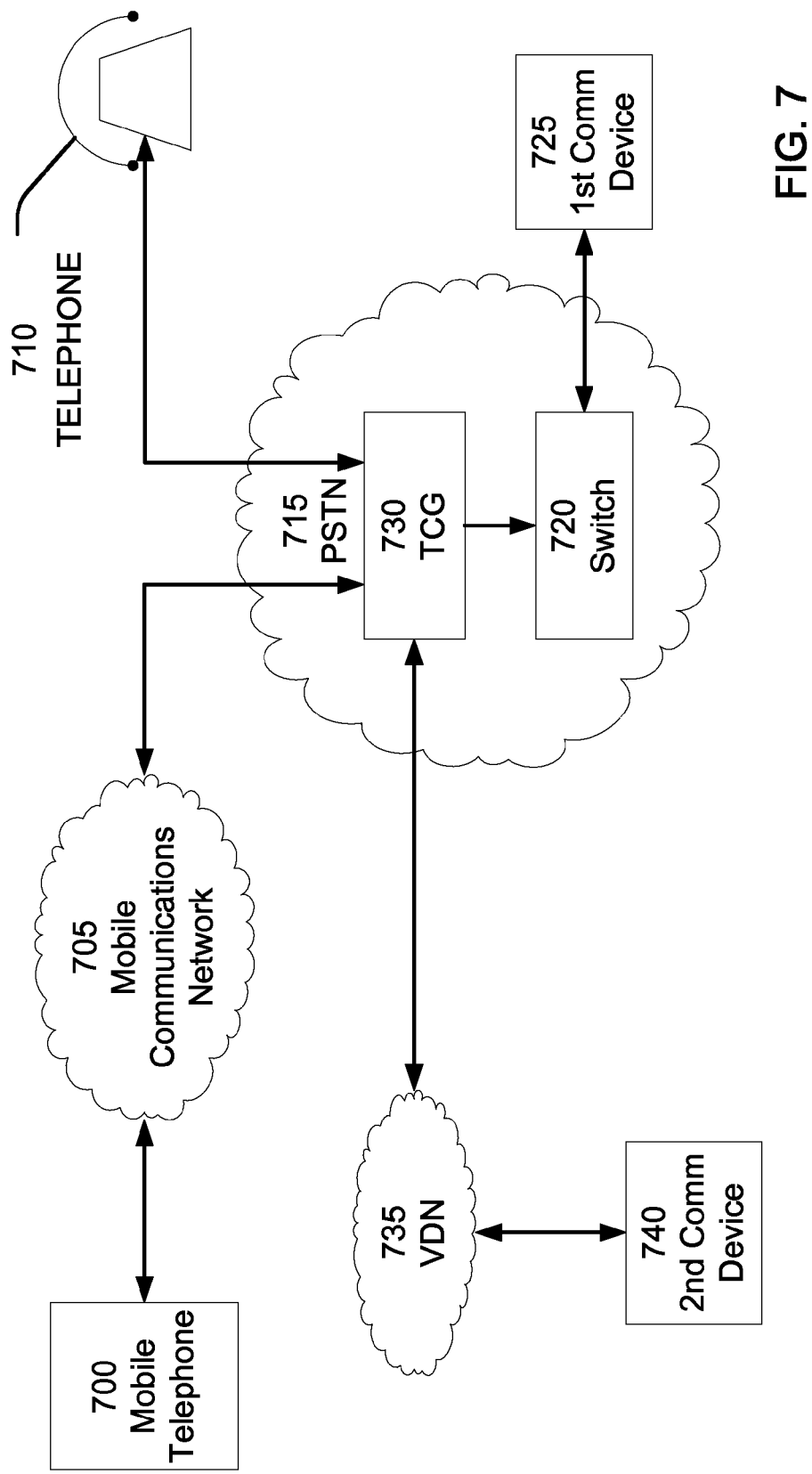

SYSTEM AND METHODS TO ROUTE CALLS OVER A VOICE AND DATA NETWORK

CLAIM OF PRIORITY

The present application claims priority from and is a continuation of patent application Ser. No. 10/624,433 filed on Jul. 22, 2003 and entitled "A SYSTEM AND METHOD FOR ROUTING TELEPHONE CALLS OVER A VOICE AND DATA NETWORK," which claims priority under 35 U.S.C. §119(e) to provisional patent application 60/484,385 filed on Jul. 2, 2003, the contents of both of which are expressly incorporated herein by reference in their entirety.

FIELD OF THE DISCLOSURE

The present disclosure relates generally to routing of telephone calls. More particularly, the present disclosure relates to the routing of telephone calls initiated on a wired or wireless telecommunication network to a voice and data network (VDN).

BACKGROUND

It is known in the art to place telephone calls around the world using conventional public switched telephone network systems. FIG. 1 illustrates a simplified diagram of how a call, such as a long distance call, is handled. A first caller uses a telephone 100 and makes a call that is routed though a public switched telephone network (PSTN) 110 to another phone 105 anywhere in the world. Similarly, as shown in FIG. 2, a mobile phone user may use a mobile phone 200 to make a call that is first routed to a mobile phone network 205 and then to a PSTN 210 where it can then be routed to a telecommunications device 215 located any place around the world, such as a telephone 220 located in another country.

Operators of PSTNs charge callers for the routing of phone calls. Though the exact amounts of the charges vary depending on market circumstances, it is almost universally true that the further away the call is going (i.e., long distance calls), the greater the cost to the user. This is particularly true when calls cross political boundaries, such as borders between countries, as well as physical boundaries, such as oceans.

Vendors currently offer products that permit telecommunications to be carried via a VDN such as the Internet. For example, Vonage is a company that uses the Cisco ATA unit. Features that allow mobile telephone usage over the Internet cannot offer this calling activity with this unit. The Cisco ATA unit is broadband only and does not provide a means to attach to a phone jack in the wall. Without attachment to the wall, the Vonage-Cisco unit cannot detect incoming PSTN calls. Without the ability to detect incoming PSTN calls, the Vonage-Cisco unit cannot then bridge PSTN callers into the Vonage voice over Internet Protocol (VoIP) network.

Packet 8 sells an Internet access device (IAD) (called DTA310) that is broadband only. The DTA310 provides a single RJ-11 connection for an analog phone. The DTA310 does not provide a means to attach the unit to a phone jack in the wall. Without attachment to the wall, the Packet 8 unit cannot detect incoming PSTN calls; without the ability to detect incoming PSTN calls, the Packet 8 unit cannot then bridge PSTN callers into the Packet 8 VoIP network.

Net2Phone sells a line of IAD units supporting both broadband and narrowband dialup. One unit provides a 2-port gateway that includes means to connect directly to a phone jack in the wall. It is unknown if the hardware architecture of the Net2Phone unit supports the ability to bridge a mobile caller into their VoIP network. However, firmware does not appear to be available for the current IAD units to make VoIP calling from non-VoIP telephones a reality.

What would be useful are a system and method for routing calls originating from the PSTN and mobile telephone networks to VDN thereby permitting telephone users to take advantage of the Internet as a telecommunication network for the placing of long distance telephone calls.

BRIEF DESCRIPTION OF THE DRAWINGS

FIG. 7 illustrates a block diagram of a PSTN having means for sending a call over a voice and data network (VDN) at the direction of a caller in accordance with a particular embodiment.

DETAILED DESCRIPTION

Figure 1:
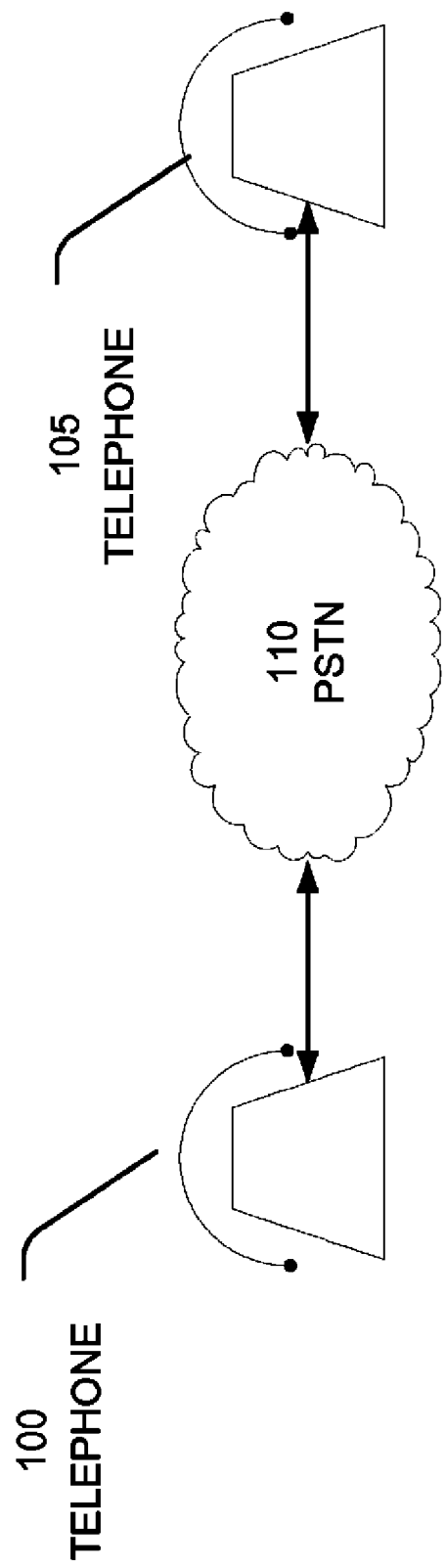
FIG. 1 illustrates a diagram of a standard phone call according to the prior art.
Figure 2:
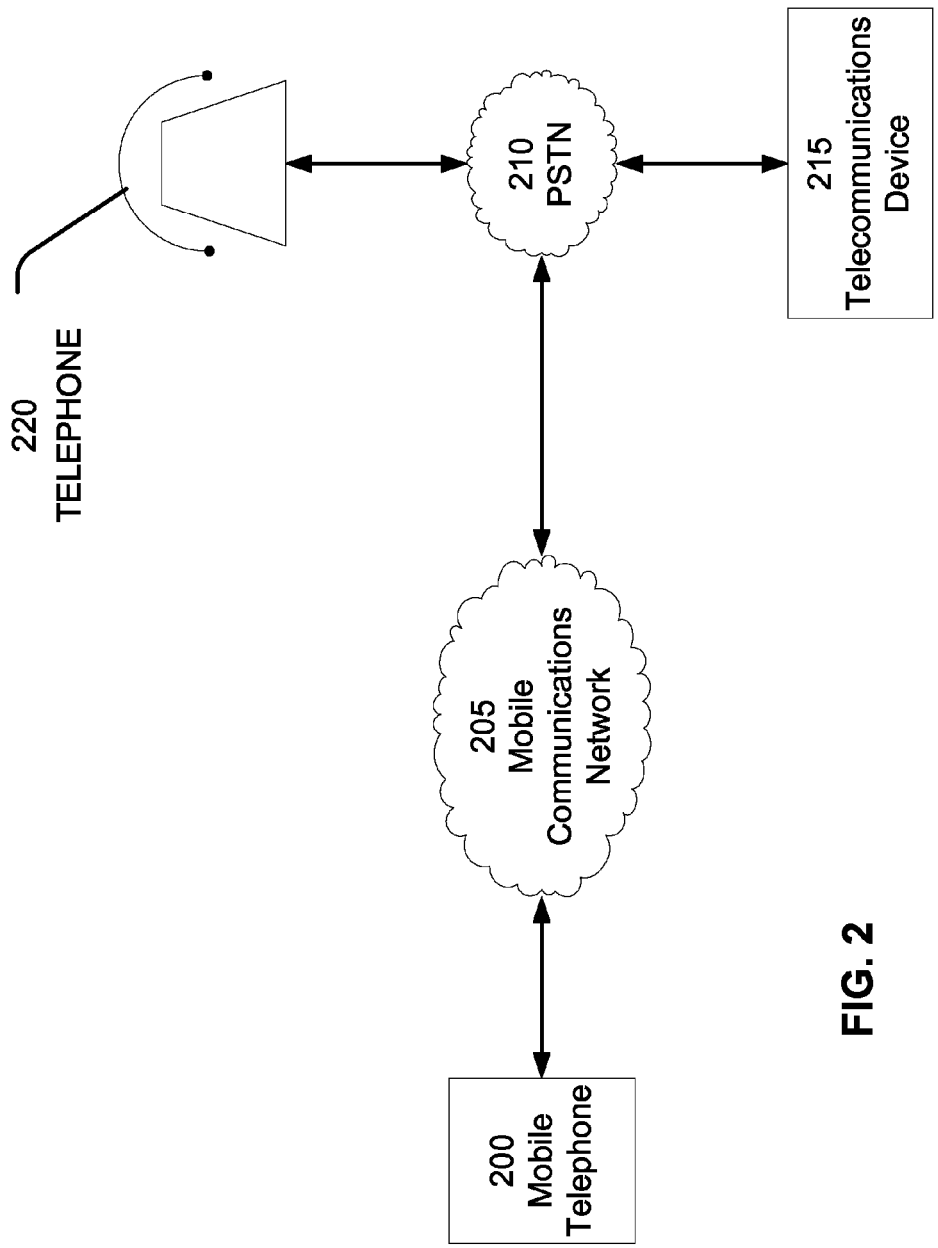
FIG. 2 illustrates a diagram of a cell phone call according to the prior art.

In a particular embodiment, a telecommunications gateway (TCG) receives communications (such as an incoming call) from a remote location via a communications device (either via a Public Switch Telephone Network (PSTN) or a wireless network operated by a mobile service provider). The TCG initiates a call from the TCG to a remote communication device over a voice and data network (VDN). In an embodiment, the VDN is the Internet and the remote communication device is a telephone (either wired or mobile), but the present disclosure is not so limited. The TCG functions as a bridge between the communications device that initiated the incoming call and the remote communication device. In another embodiment, the functions of the TCG are performed by equipment operated by the operator of a PSTN.

A "mobile communication device" may include, for example, a wireless telephone (e.g., a cellular telephone), another mobile telephony device or another mobile communication device (such as a wireless personal data assistant or a computer having a wireless network interface card) that can access long distance services in order to send or receive data. Thus, while this disclosure discusses the routing of mobile telephone calls, those skilled in the art will understand that this technology and method apply equally to other mobile devices as well.

It is an aspect of the disclosure to enable users to make long distance calls using the Internet as a communication network of choice.

It is a further aspect of the disclosure to enable mobile telephone users to take advantage of the Internet as a telecommunication network for the placing of long distance telephone calls.

It is yet another aspect of the disclosure to support "Anywhere-Anytime" VoIP access.

It is another aspect of the disclosure to provide access to Voice over Internet Protocol (VoIP) calling without regard to the technology used by a calling party or a receiving party.

It is yet another aspect of the disclosure to support all mobile providers worldwide, regardless of their format (e.g., CDMA, TDMA, GSM) and protocols used.

These and other aspects of the disclosure will become apparent from a review of the general and detailed descriptions that follow.

In a particular embodiment, a TCG receives communications from a remote location via a communications device (either via a PSTN or via a wireless network operated by a mobile service provider). The TCG initiates a call from the TCG to a remote communication device over a VDN. By way of illustration and not as a limitation, a call is made from a first communication device to a second communication device to which the TCG is connected. The call is then intercepted at the TCG, where the call is converted into a bit stream according to an appropriate protocol that is transferable over a VDN. In an embodiment, the VDN is the Internet. The bit stream may include proper identifiers and routing indications. The converted call may then be sent over the VDN to another PSTN or to another TCG and finally to the end destination (i.e., the remote communication device).

In another embodiment, the functions of the TCG are performed by equipment operated by the operator of a PSTN. For example, the TCG may be under the control of the operation of the PSTN and a caller may direct the PSTN to route the call over a VDN.

In a particular embodiment, a TCG receives communications from a remote location via an in incoming call (either from the PSTN or a mobile service provider). The TCG initiates a call to a remote communication device over a VDN. In another embodiment, the VDN is the Internet and the remote communication device is a telephone (either wired or mobile), but the disclosure is not so limited. The TCG functions as a bridge between a device at the remote location that initiated the incoming call and the remote communication device. By way of illustration and not as a limitation, a caller first places a call on a telephone (wired or mobile) to an end destination where the user's TCG is connected. The call is intercepted at the TCG and is converted into a bit stream according to an appropriate protocol that is transferable over a VDN. In an embodiment, the VDN is the Internet. The bit stream may include proper identifiers and routing indications. In another embodiment, the bit stream includes discrete packets. The converted call is then sent over the VDN to another PSTN or another TCG and finally to the end destination.

Figure 3:
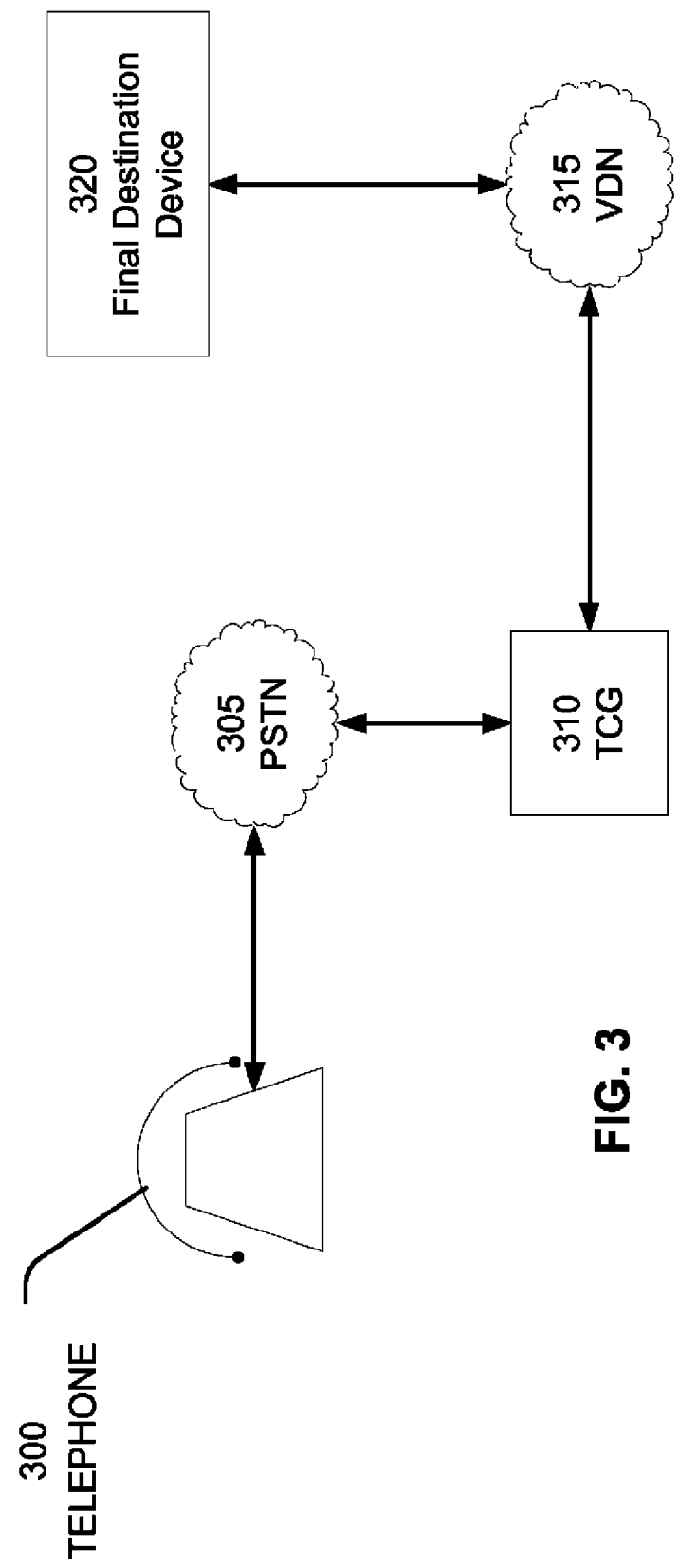
FIG. 3 illustrates a diagram of a Plain Old Telephone Service (POTS) phone call routed through the Internet according to a particular embodiment.

FIG. 3 illustrates a diagram of a phone call placed over a PSTN 305 and routed through a VDN 315 (such as the Internet). By way of illustration and not as a limitation, a call is initiated by a caller on a telephone 300 to a number associated with a TCG 310. The call may be routed normally to the TCG 310 through the PSTN 305. The call may be authenticated as being from an authorized user. If appropriate signaling is received from the caller, the TCG 310 may convert the call (e.g., telephone signals) into a bit stream according to an appropriate protocol that is transferable over a VDN 315. In an embodiment, the VDN 315 is the Internet. The bit stream may include proper identifiers and routing indications. In another embodiment, the bit stream includes discrete packets. The converted call is then sent to a final destination device 320 via the VDN 315. The path to the final destination device 320 may be via another PSTN or another TCG.

Figure 4:
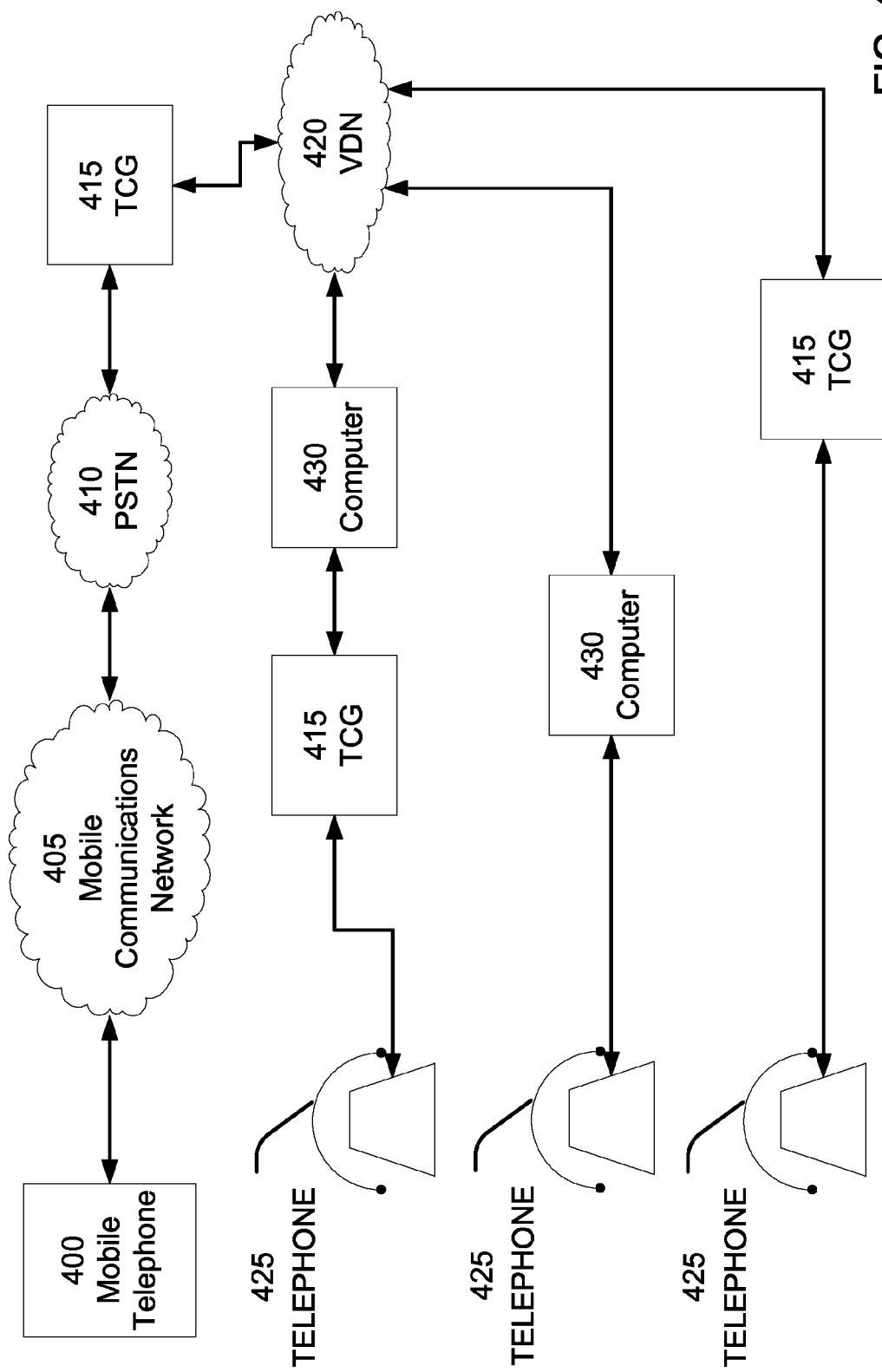
FIG. 4 illustrates a diagram of a mobile phone call routed through the Internet according to one embodiment.

FIG. 4 illustrates a diagram of a mobile phone call routed through the Internet according to a particular embodiment. A user (or caller) places a call on a mobile phone 400 that is linked to a mobile phone network 405. The call may be routed though a PSTN 410 to a TCG 415. The TCG 415 may authenticate the caller and, if the caller is authenticated, the TCG 415 converts the call (i.e., phone signals) into a bit stream according to an appropriate protocol that is transferable over a VDN 420. In an embodiment, the VDN 420 is the Internet. The bit stream may include proper identifiers and routing indications. In another embodiment, the bit stream includes discrete packets.

The converted call may be directed over the VDN 420 to another telecommunications device. As illustrated in FIG. 4, the telecommunication device may be a telephone 425 connected to another TCG 415, to a telephone 425 connected to a computer 430, or to a telephone 425 connected to a TCG 415 that is connected to the VDN 420 via a computer 430. However, the present disclosure is not so limited. The telecommunications device to which the call is directed may be any device capable of receiving and processing data sent by the caller.

In one embodiment, the call made by the mobile telephone 400 is to a phone number associated with the TCG 415. In another embodiment, the phone number is associated with a plurality of TCGs of a TCG network, and the mobile phone call is routed to a particular TCG on the TCG network. In these embodiments, once the mobile telephone 400 has connected with the TCG 415, the user may be prompted for a dialing sequence, which corresponds with another TCG or to a PSTN telephone call.

As noted above, in a particular embodiment, the TCG 415 performs an authentication step wherein a user (e.g., a caller) or an account associated with a calling telecommunication device (e.g., the mobile telephone 400) is identified. Based upon this identification, the call is either allowed to proceed or is not allowed to proceed. In an embodiment, the authentication of the caller is achieved using caller identification (ID) data associated with the call. The call may be received from either a plain old telephone service (POTS) device, a mobile telephone or another mobile device. Other authentication methods, such as using an electronic serial number (ESN), may be used to authenticate the caller at the TCG 415. Similarly, any other authentication system that uniquely identifies a user or group of users is within the scope of the disclosure. For example, the caller may be prompted for more information such as a password or access code.

Though the Internet is used in the above example, the disclosure contemplates the use of any VDN 420 that is capable of transferring information as described by the present disclosure.

Figure 5:
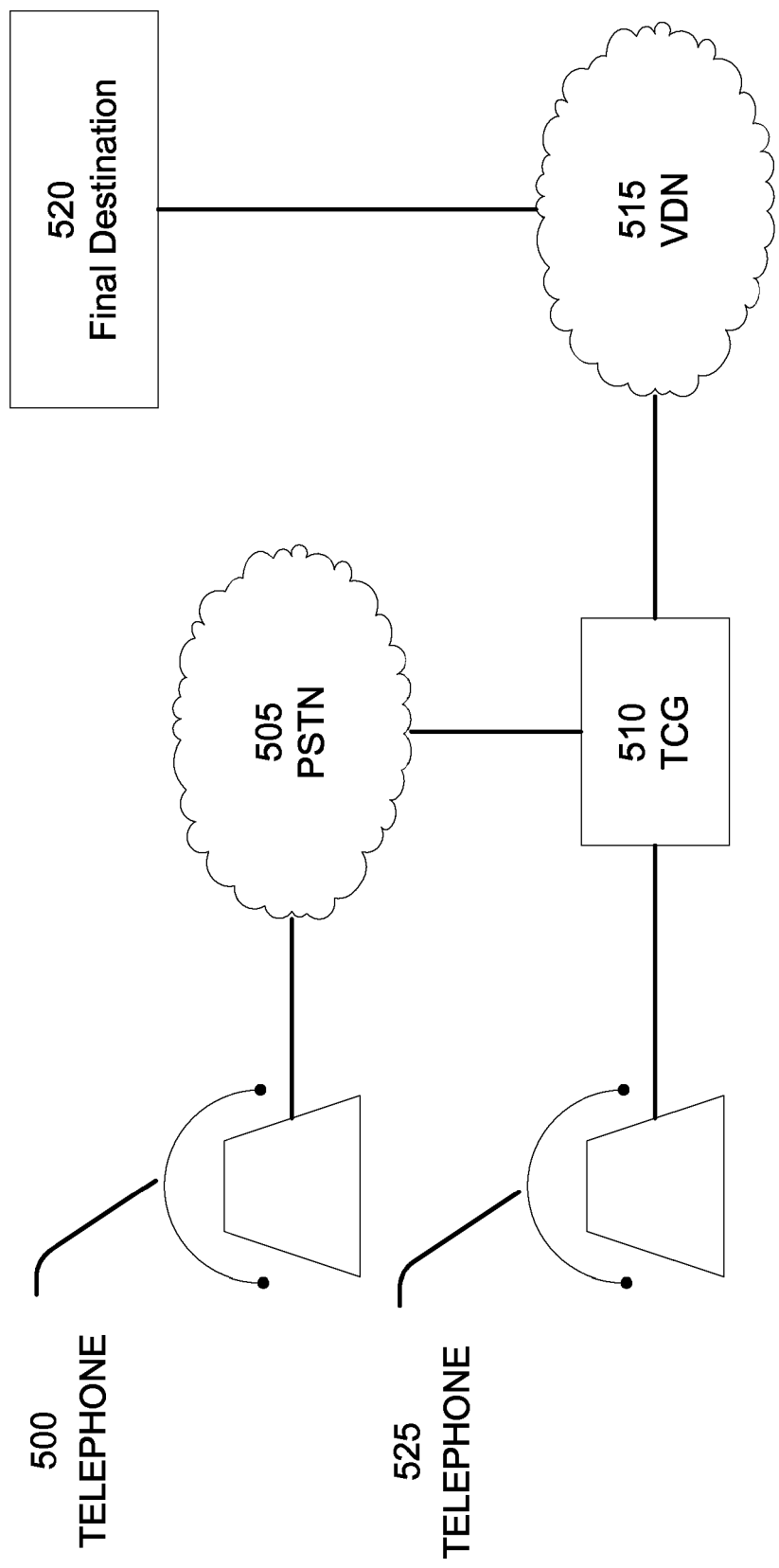
FIG. 5 illustrates a second diagram of a mobile phone call routed through the Internet according to a particular embodiment.

FIG. 5 illustrates another embodiment where the call routing system discussed in reference to FIG. 3 is adapted to permit a call to be routed to a telephone 525 physically connected to a TCG 510 rather than directed to a VDN 515. This transfer to the telephone 525 physically connected to the TCG 510 rather than to the VDN 515 may be initiated by a selection on a telephone 500, or by a lack of a selection, either when the call is first made or once a connection with the TCG 510 is established. The selection may take a variety of forms such as determining the presence of a long distance designator (for example, the # sign) in the telephone number associated with the TCG 510, or not and waiting for an internal timer to note the absence of a "#" sign. However, such dialing notifications may include but not be limited to depressing of a predetermined key, lack of selection of a predetermined key, or the calling of a unique telephone number. Although not illustrated, the call routing system discussed in reference to FIG.

4 may be similarly adapted to direct the call from the mobile telephone 400 to the telephone 425 physically connected to the TCG 415.

Figure 6:
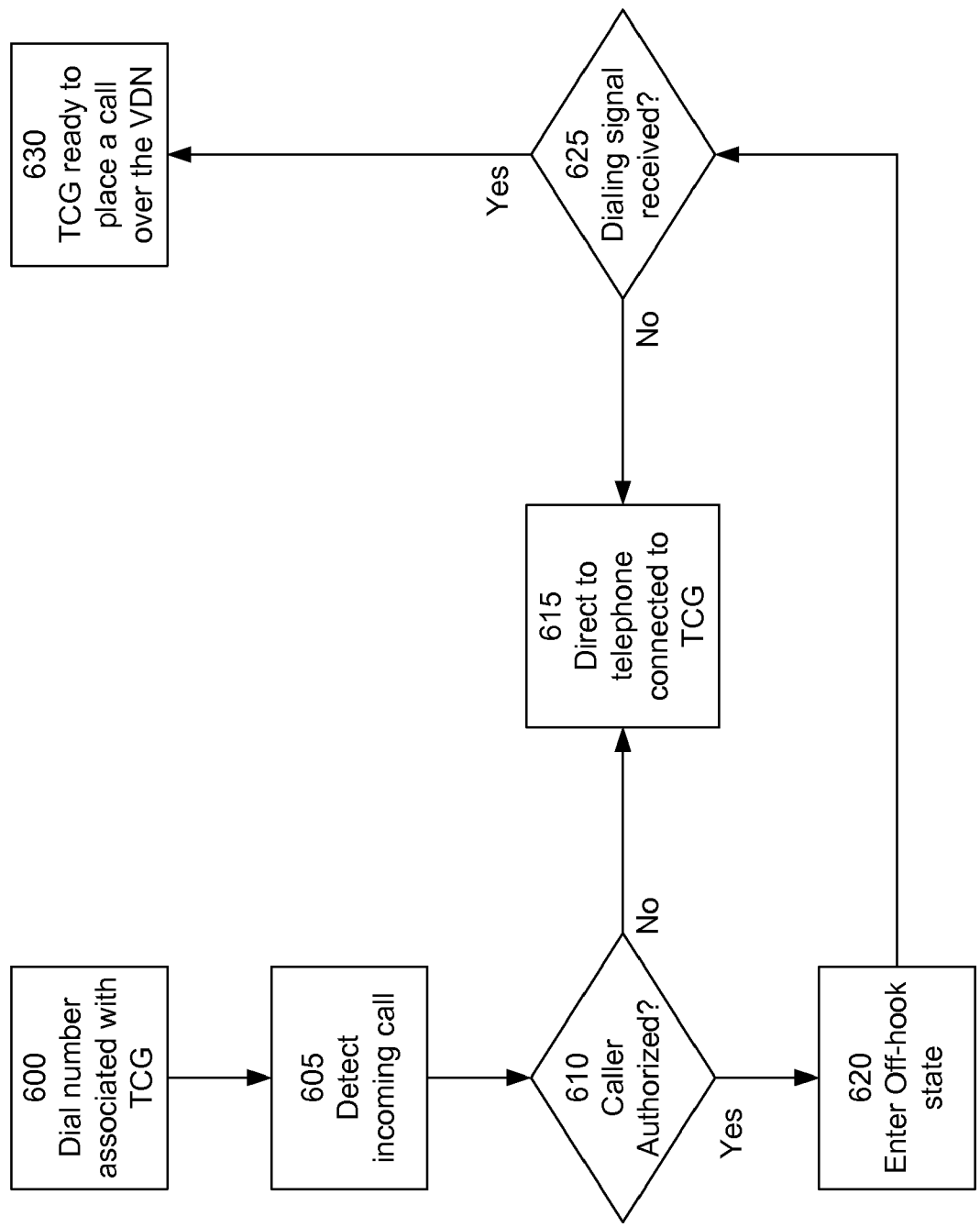
FIG. 6 illustrates a logical flow of placing a telephone call from a mobile telephone using a particular embodiment.

Referring now to FIG. 6, a method for placing calls over the Internet (for example) from a mobile telephone is illustrated. A mobile phone user first dials a number associated with a PSTN line connected to a TCG, at 600. The TCG detects the incoming call, at 605. A determination is made whether a caller is authorized to access a VDN through the TCG, at 610. If the caller does not present acceptable authorization credentials, at 615, the call is directed to a telephone connected to the PSTN line.

If the caller's authorization credentials are accepted, the TCG enters an "off-hook" state, at 620, and determines whether a dialing signal is received, at 625. If no dialing signal is received, the TCG passes the call through to the telephone connected to the PSTN line, at 615.

If a dialing signal is received, the TCG is ready for entry of a number or address to place a call over the VDN, at 630, according to the convention established by the TCG manufacturer and/or the VoIP service provider providing VoIP service.

In an embodiment, the authorization credentials include caller ID data. In another embodiment, the caller is prompted to provide the authorization credentials. In yet another embodiment, in the event that the authorization credentials are accepted, the TCG emits a uniquely identifiable tone to alert the caller to enter the dialing signal. In yet another embodiment, the dialing signal includes the "#" sign.

The caller may follow the dialing signal with a telephone number or address, as previously discussed. In an alternate embodiment, the TCG identifies that a long distance call is desired by the initial dialing to the TCG. The TCG routes the call over a VDN, such as the Internet, to the desired long distance phone. Thus, placing a long distance call via the TCG may cost no more than a local call.

FIG. 7 illustrates a block diagram of a PSTN 715 that can send a call over a VDN 735 at the direction of a caller in accordance with an embodiment. The PSTN 715 includes a switch 720 and a TCG 730. The PSTN 715 receives mobile calls from a mobile telephone 700 via a mobile communication network 705. The PSTN 715 also receives calls from a telephone 710. Calls received by the PSTN 715 are processed by the TCG 730 and their destination is determined as previously discussed. Calls destined for a first communication device 725 are passed to the switch 720 and the caller is connected to the first communication device 725 via the PSTN 715. Calls destined for a second communication device 740 are passed to the VDN 735 and ultimately to the second communication device 740.

By way of illustration and not as a limitation, the telephone 710 places a call to another telephone on the PSTN 715. In this illustration, the first communication device 725 may be the other telephone. The call is evaluated by the TCG 730 and routed through the switch 720. Similarly, a call placed by the mobile telephone 700 to the first communication device 725 may be routed over the PSTN 715 and through the switch 720. By contrast, a caller may designate (using a VDN designator) that the call is to be transported via the VDN 735 to the second communication device 740. The second communication device 740 may be any device or combination of devices that may be connected to, and receive communications from, the VDN 735, including a telephone. (For example, see FIG. 4.) In this embodiment, the TCG 730 determines whether the VDN designator is present in the dialed number and, if so, routes the call to the VDN 735 for ultimate delivery to the second communication device 740.

The present disclosure describes use of a TCG in its various embodiments. The TCG itself may implement multiple digital networking protocols using a telephony protocol engine (TPE). One such protocol that may also be used is the Session Initiation Protocol, or SIP. SIP is an Internet Engineering Task Force (IETF) signaling protocol for establishing real-time calls and conferences over Internet Protocol networks. In this embodiment, the TPE may be implemented using inexpensive, memory limited microprocessors and inexpensive flash memory. However, this is not meant as a limitation. As will be apparent to those skilled in the art, particular embodiments may be implemented in other computing contexts without departing from the scope of the present disclosure.

What is claimed is:

1. A method of routing a call over a voice and data network (VDN) to a destination device, the method comprising:
    receiving a call from a calling device at a telecommunications gateway (TCG);
    receiving authentication data via the call;
    determining whether a user account associated with the authentication data is authorized to route calls via the TCG to a VDN;
    when the user account is authorized to route calls via the TCG to the VDN, converting call data received at the TCG via the call into a format compatible with the VDN;
    sending a dialing signal to the calling device after determining that the user account is authorized to route calls via the TCG to the VDN;
    receiving a destination address associated with the destination device in response to the dialing signal, wherein the destination address is used to send the converted call data via the VDN to the destination device: and
    sending the converted call data via the VDN to a destination device.

2. The method of claim 1, wherein converting the call data into a format compatible with the VDN includes generating a bit stream including a plurality of data packets and adding an identifier and a routing indication to each data packet of the plurality of data packets.

3. The method of claim 2, wherein the identifier includes an address associated with the destination device.

4. The method of claim 1, wherein the converted call data is sent to the destination device via the VDN and via a public switched telephone network (PSTN).

5. The method of claim 1, wherein the VDN is the Internet.

6. The method of claim 1, wherein the authentication data comprises caller ID data associated with the calling device.

7. The method of claim 1, wherein the call is received at the TCG in response to a user entering a calling code associated with the destination device.

8. The method of claim 1, further comprising, in response to receiving the call, prompting the calling device for a VDN designator, wherein determining whether the user account is authorized to route calls via the TCG to the VDN is performed when the VDN designator is received; and wherein the call is routed via a switch to a second destination device when the VDN designator is not received.

9. A method of routing a call over a voice and data network (VDN) to a destination device, the method comprising:
    receiving a call from a calling device at a telecommunications gateway (TCG);
    determining whether a VDN designator is present in input provided at the calling device;
    when the VDN designator is present, converting call data received via the call into a format compatible with a VDN;

sending the converted call data to a destination device via the VDN;

sending a dialing signal to the calling device in response to determining that the VDN designator is received; and receiving a calling code from the calling device in response to the dialing signal, wherein the calling code identifies the destination device.

10. The method of claim 9, wherein the input provided at the calling device includes a calling code associated with the TCG, and wherein the VDN designator is part of the calling code.

11. The method of claim 9, wherein the input provided at the calling device includes a calling code provided in response to a prompt, wherein the method further comprises sending the prompt to the calling device after receiving the call.

12. The method of claim 9, wherein the VDN designator is a tone produced by pressing a "#" key on a telephone keypad.

13. The method of claim 9, further comprising, before sending the converted call data to the destination device via the VDN, determining whether a user account associated with authentication data received via the call is authorized to route calls via the TCG to the VDN.

14. The method of claim 13, wherein the authentication data includes an electronic serial number of the calling device.

15. A telecommunications gateway (TCG), comprising:

a first communication connection to receive a call from a communications network;

a second communication connection to send the call to a second communications network; and a processor, wherein the processor:

evaluates data received via the call to select the second communications network from between a voice and data network (VDN) and a public switched telephone network (PSTN);

when the VDN is selected, evaluates authentication data associated with the call to determine whether the call is authorized to be sent via the VDN;

when the call is authorized to be sent via the VDN, executes a telephony protocol engine (TPE) to convert the call to a protocol compatible with the VDN;

sends a dialing signal to the second communications network after determining that a user account is authorized to route calls via the TCG to the VDN;

receives a destination address associated with the destination device in response to the dialing signal, wherein the destination address is used to send the converted call data via the VDN to the destination device; and sends the call to the destination device via the VDN.

16. The TCG of claim 15, wherein the first communications network comprises a mobile communications network.

17. The TCG of claim 15, wherein the first communications network comprises a PSTN.

18. The TCG of claim 15, wherein, when the call is not authorized to be sent via the VDN, the processor sends the call to the destination device via the PSTN.

19. The TCG of claim 15, wherein the VDN is the internet.

* * * * *